(12) United States Patent
Oezkan et al.

(10) Patent No.: US 12,318,862 B2
(45) Date of Patent: Jun. 3, 2025

(54) FASTENING ELEMENT FOR FRICTION WELDING AND METHOD FOR FRICTION WELDING A FASTENING ELEMENT ONTO A PLANAR WORKPIECE

(71) Applicant: Ford Global Technologies, LLC, Dearborn, MI (US)

(72) Inventors: Ferat Oezkan, Übach-Palenberg (DE); Julius Maximilian Engelke, Aachen (DE); Francesco Italiano, Kelmis (BE); Mohamed Youssef, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/106,236

(22) Filed: Feb. 6, 2023

(65) Prior Publication Data

US 2023/0173607 A1 Jun. 8, 2023

Related U.S. Application Data

(63) Continuation of application No. 16/812,197, filed on Mar. 6, 2020, now Pat. No. 11,577,338.

(30) Foreign Application Priority Data

Mar. 6, 2019 (DE) .......................... 102019203051.3

(51) Int. Cl.
*B23K 20/00* (2006.01)
*B23K 20/12* (2006.01)
*B23K 20/26* (2006.01)

(52) U.S. Cl.
CPC ........ *B23K 20/129* (2013.01); *B23K 20/1295* (2013.01); *B23K 20/26* (2013.01)

(58) Field of Classification Search
CPC .................. B23K 20/129; B23K 20/26; B23K 20/1285–1295; B23K 20/12–1215; B23K 20/127; B29C 65/08
USPC .... 228/112.1–114.5, 2.1–2.3; 156/73.1–73.6
See application file for complete search history.

(56) References Cited

U.S. PATENT DOCUMENTS

| | | | | |
|---|---|---|---|---|
| 4,850,772 A | * | 7/1989 | Jenkins ............... | B23K 35/0288 228/2.3 |
| 6,220,804 B1 | * | 4/2001 | Pamer .................. | F16B 37/068 411/188 |
| 8,434,962 B2 | * | 5/2013 | Christ ................. | B23K 20/1295 228/112.1 |
| 2004/0118900 A1 | * | 6/2004 | Stevenson .......... | B23K 20/1295 228/2.1 |
| 2004/0247380 A1 | * | 12/2004 | Ross ..................... | B23P 19/062 403/282 |
| 2006/0175381 A1 | * | 8/2006 | Wang .................. | B23K 20/1245 228/2.1 |
| 2006/0213954 A1 | * | 9/2006 | Ruther .................. | B21J 15/027 228/114.5 |

(Continued)

FOREIGN PATENT DOCUMENTS

| | | | | | |
|---|---|---|---|---|---|
| CN | 103878476 A | * | 6/2014 | ............ | B21J 15/027 |
| CN | 106112543 A | * | 11/2016 | ............ | B21J 15/025 |

(Continued)

*Primary Examiner* — Kiley S Stoner
(74) *Attorney, Agent, or Firm* — Burris Law, PLLC

(57) ABSTRACT

An assembly includes a workpiece and a fastening element. The fastening element is configured to drill a hole in the workpiece and allow the fastening element to be friction-welded to the workpiece.

15 Claims, 5 Drawing Sheets

(56) References Cited

U.S. PATENT DOCUMENTS

Figure 1:
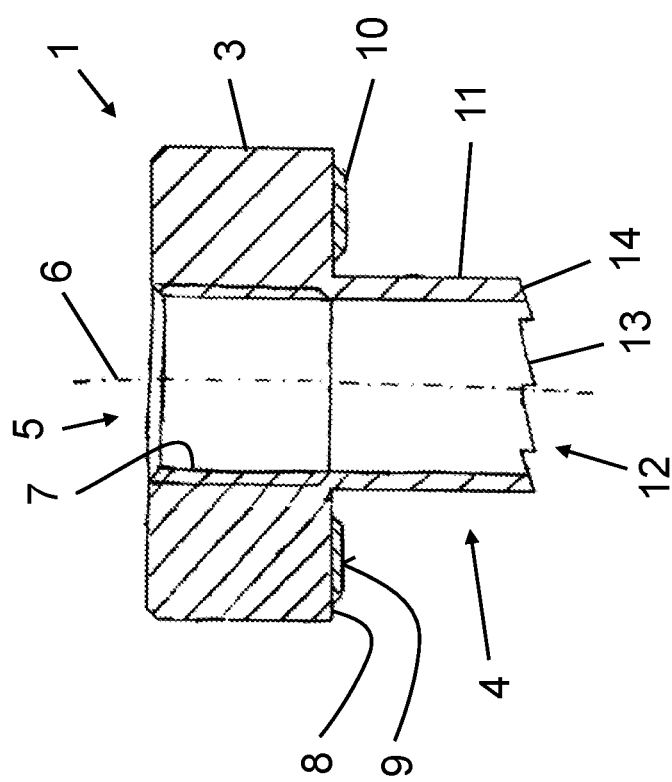

| | | | | |
|---|---|---|---|---|
| 2007/0172335 A1* | 7/2007 | Christ | ................ | B23K 35/0288 |
| | | | | 411/408 |
| 2007/0251979 A1* | 11/2007 | Mauer | ................... | F16B 11/004 |
| | | | | 228/2.3 |
| 2009/0263207 A1* | 10/2009 | Christ | ................ | B23K 35/0288 |
| | | | | 411/171 |
| 2010/0119772 A1* | 5/2010 | Christ | ................... | F16B 37/061 |
| | | | | 228/114.5 |
| 2011/0182657 A1* | 7/2011 | Eberhard | .......... | B23K 20/1295 |
| | | | | 403/270 |
| 2013/0004234 A1* | 1/2013 | Christ | ................ | B23K 20/1295 |
| | | | | 403/265 |
| 2018/0154426 A1* | 6/2018 | Xiao | ..................... | B23K 20/22 |
| 2018/0172045 A1* | 6/2018 | Hill | ................... | B23K 11/0066 |
| 2019/0039119 A1* | 2/2019 | Li | ......................... | B21J 15/025 |
| 2019/0099832 A1* | 4/2019 | Freis | ................. | B23K 20/1295 |
| 2020/0324363 A1* | 10/2020 | Abke | .................. | B23K 20/122 |

FOREIGN PATENT DOCUMENTS

| | | | | |
|---|---|---|---|---|
| DE | 202007016958 U1 * | 5/2009 | ........... | B23K 20/129 |
| DE | 102009006775 A1 * | 10/2009 | ........... | B21J 15/027 |
| JP | 63028631 A * | 2/1988 | ......... | B29C 65/0672 |
| WO | WO-9856535 A1 * | 12/1998 | ........... | B23K 20/129 |
| WO | WO-03000455 A1 * | 1/2003 | ............. | B23K 20/12 |

* cited by examiner

FASTENING ELEMENT FOR FRICTION WELDING AND METHOD FOR FRICTION WELDING A FASTENING ELEMENT ONTO A PLANAR WORKPIECE

CROSS-REFERENCE TO RELATED APPLICATIONS

This application is a continuation application of U.S. application Ser. No. 16/812,197, filed Mar. 6, 2020, which claims priority to and the benefit of German Application 102019203051.3 filed on Mar. 6, 2019. The disclosures of the above applications are incorporated herein by reference.

FIELD

The present disclosure relates to a fastening element for friction welding onto a planar workpiece and to a method for friction welding a fastening element to a planar workpiece.

BACKGROUND

The statements in this section merely provide background information related to the present disclosure and may not constitute prior art.

DE 196 42 331 A1 describes a friction welding method with which a welded connection is established between an anchor bolt and an anchor rail. For this friction welding process, the anchor bolt has a concentric annular ring on one end side. With this annular ring, the anchor bolt is set on a surface of the anchor rail and is pressed with a contact force against the surface. A rotation apparatus rotates the anchor bolt, whereupon the resulting friction heat causes at least partial melting of the annular ring and/or of the surface of the anchor rail. The subsequent cooling process and the associated solidification of the melts establishes the friction-welded connection between the anchor bolt and the anchor rail.

DE 10 2004 034 496 A1 discloses a fastening element designed as a friction welding nut which is welded to a planar sheet-metal part through a friction welding procedure. The friction welding nut comprises a nut body with a threaded bore and an end side designed as a friction welding face. In order to establish the friction-welded connection, the friction welding face is pressed against the surface of the sheet-metal part and the friction welding nut is rotated. This friction welding nut makes it possible to provide, on the sheet-metal part, a one-sided screw connection for attaching a further component.

US 2004/0247380 A1 discloses a fastening element designed as a press nut to be pressed into a planar sheet-metal part. This press nut comprises a nut head with a threaded bore and a conical shaft element adjoining the nut head. For pressing the press nut into the sheet-metal part, the press nut is positioned on a surface of the sheet-metal part and an anvil for the press nut is positioned on the opposite side of the sheet-metal part. As the press nut and the anvil are pressed together, the shaft element is pressed into the sheet-metal part and a through-hole is punched into the sheet-metal part. The conical configuration of the shaft element with a notched outer contour means that the press nut is held in the stamped hole such that it cannot rotate. The stamped hole permits access from both sides to the press nut pressed into the sheet-metal part, but a press connection of this kind has a lower tensile strength than a friction-welded connection. Moreover, the pressing procedure requires an additional anvil.

In view of the prior art described, there is room for improvement in the field of fastening elements to be attached to a workpiece.

SUMMARY

This section provides a general summary of the disclosure and is not a comprehensive disclosure of its full scope or all of its features.

The present disclosure provides a fastening element for a friction welding procedure and a method for friction welding a fastening element which permits simple attachment to a workpiece.

It is to be pointed out that the features and measures specified individually in the following description may be combined with one another in any desired technically meaningful way and disclose further configurations of the present disclosure. The description, in particular in conjunction with the figures, characterizes and specifies the teachings of the present disclosure further.

In one form of the present disclosure, an assembly is provided, which includes a workpiece and a fastening element. The fastening element is configured to drill a hole in the workpiece and allow the fastening element to be friction-welded to the workpiece.

In other features, the fastening element includes a head portion, a shaft extending from the head portion, and a cutting device disposed on the shaft. The head portion is friction-welded to the workpiece. The fastening element is friction-welded to the workpiece along an annular surface of the head portion surrounding the shaft. The head portion includes an end surface from which the shaft extends, the end surface being friction-welded to the workpiece. The workpiece is welded to only the end surface of the head portion of the fastener. The shaft is disposed in the hole of the workpiece. The hole in the workpiece is a through hole. The workpiece has a top surface that is friction-welded to the head portion and a bottom surface opposing the top surface, the shaft being exposed from and/or extending beyond the bottom surface of the workpiece. The cutting device is disposed at a free end of the shaft. The fastening element defines a through bore extending along a central axis of the fastening element and further includes an internal thread on an inner surface of the through-bore. The head portion, the shaft, and the cutting device are one piece.

According to another form of the present disclosure, an assembly is provided, which includes a workpiece, and a fastening element including a head portion, a shaft, and a cutting device attached to the head portion. The fastening element is configured to drill a hole by the cutting device and allow the head portion to be friction-welded to the workpiece when the shaft is inserted into the hole with the head portion contacting the workpiece.

In still another form of the present disclosure, a method for attaching a fastening element to a workpiece is provided, which includes: rotating the fastening element against a surface of the workpiece; drilling, by the cutting device, a hole in the workpiece while inserting a portion of the fastening element into the hole of the workpiece until another portion of the fastening element is in contact with the surface of the workpiece; and friction-welding the another portion of the fastening element to the surface of the workpiece.

In other features, the fastening element includes a head portion, a shaft extending from the head portion, and a cutting device disposed on the shaft. the shaft is inserted into the hole in the workpiece during drilling the hole by the cutting device. The head portion includes an end surface from which the shaft extends, the end surface of the head portion being friction-welded to the surface of the workpiece by rotating the head portion against the surface of the workpiece. The method further include inserting the shaft into the hole to expose the shaft from another surface of the workpiece opposing the surface that is friction-welded to the head portion. The hole in the workpiece is a through hole.

A fastening element having such a cutting device makes it possible, in just one process step, both to introduce the drilled hole into the workpiece and also to permanently connect the fastening element to the workpiece by a friction welding procedure. This workpiece can in particular be a thin-walled sheet-metal part, for example a sheet-metal part of a vehicle body. Since, in vehicle construction, a multiplicity of fastening possibilities are provided on sheet-metal parts, the fastening element according to the present disclosure makes it possible to reduce the number of process steps and, as a result, the reduced production effort makes it possible to significantly reduce production times and production costs. The introduction of the drilled hole into the workpiece also makes the fastening element accessible from both sides of the workpiece.

In some variations of the present disclosure, the fastening element provides that the cutting device extends from the end side, designed as a friction welding face, of the nut head to a longitudinal central axis of the nut head and has at least one cutting element. A cutting device of this kind makes it possible to first introduce the drilled hole into the workpiece and then bring the friction welding face of the fastening element to bear against the surface of the workpiece in order to establish the friction-welded connection. Insofar as the cutting device is oriented to the longitudinal central axis of the nut head, the drilled hole can be formed concentrically with the through-bore in the nut head.

In one advantageous development of the fastening element, it can be provided that the cutting device is designed as a cutting shaft with a free end portion opposite the nut head, wherein the at least one cutting element is provided on the end portion of the cutting shaft. A cutting shaft of this kind makes it possible to also drill through workpieces or sheet-metal parts whose thickness corresponds to the length of the cutting shaft, or which are just slightly thinner.

In at least one variation the cutting device, in particular the cutting shaft, is designed in the form of a hollow cylinder and is arranged concentrically with the longitudinal central axis of the nut head. This configuration and arrangement of the cutting shaft makes it possible to carry out a circular rotary cutting motion in order to introduce the drilled hole into the workpiece.

In some variations the hollow-cylindrical cutting shaft has, opposite the nut head, an end edge in the shape of a ring or a ring segment, wherein multiple cutting elements are provided at least locally on the end edge. Thus, what is formed is some kind of hole saw, core drill or drill crown, by which it is possible to introduce, into the workpiece, a drilled hole corresponding to the diameter of the cutting shaft.

In at least one variation the at least one cutting element is designed in the form of a saw tooth or a cutting segment. Such a configuration of the cutting elements makes it possible to achieve good cutting performance and a smooth cut edge. The saw teeth or cutting segments can additionally undergo a heat treatment process, in particular hardening. Cutting elements of this kind make it possible to safely and rapidly drill through sheet-metal parts and also components made of synthetic material, composite materials or fiber-reinforced composite materials.

In some variations of the fastening element the friction welding face provided on the end side of the nut head is designed in the form of a circular ring and surrounds the cutting device, in particular concentrically. The configuration of the friction welding face in the shape of a circular ring makes it possible to create a weld, between the fastening element and the workpiece, which fully surrounds the drilled hole. Thus, on one hand, a durable welded connection can be established between the fastening element and the workpiece and, on the other hand, ingress of moisture via the welded connection can be inhibited.

In at least one variation the nut head of the fastening element and the cutting device are designed in one piece. This permits simple and cost-effective production of the fastening element, for example by a deformation process.

In some variations of the fastening element the through-bore extends at least locally and continuously through the nut head and the cutting shaft, and the through-bore has, at least locally, an internal thread. This makes it possible for the fastening element welded onto the workpiece to be accessible from both sides of the workpiece for the purpose of screwing a screw into the threaded bore.

In another form of the present disclosure, a method for friction welding a fastening element onto a planar workpiece, for example a fastening element according to one or more of the above-described variations is provided. The fastening element is accommodated by a tool and made to rotate about a longitudinal central axis of the fastening element, a cutting device of the fastening element is set with a force against a surface of the workpiece, the cutting device introduces a drilled hole into the workpiece, a friction welding face, provided on the fastening element, is brought to bear against the surface of the workpiece, and the rotation of the fastening element establishes a friction-welded connection between the friction welding face of the fastening element and the workpiece. The method makes it possible to reduce the number of process steps for establishing a friction-welded connection between a fastening element and a workpiece. This is, in one process step the drilled hole is introduced into the workpiece by the cutting device and, immediately thereupon, the fastening element is welded onto the workpiece by a friction welding procedure.

Further areas of applicability will become apparent from the description provided herein. It should be understood that the description and specific examples are intended for purposes of illustration only and are not intended to limit the scope of the present disclosure.

DRAWINGS

Figure 2:
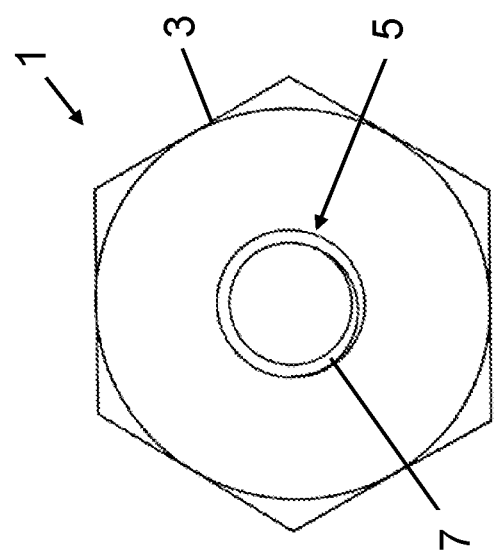
Figure 3:
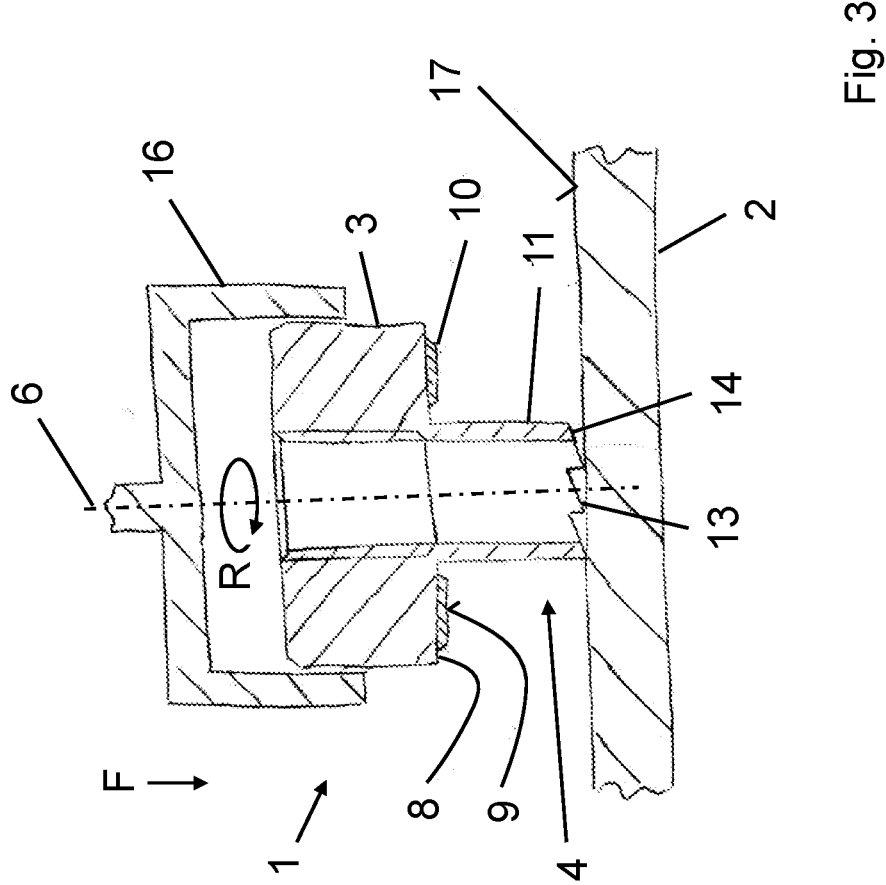
Figure 4:
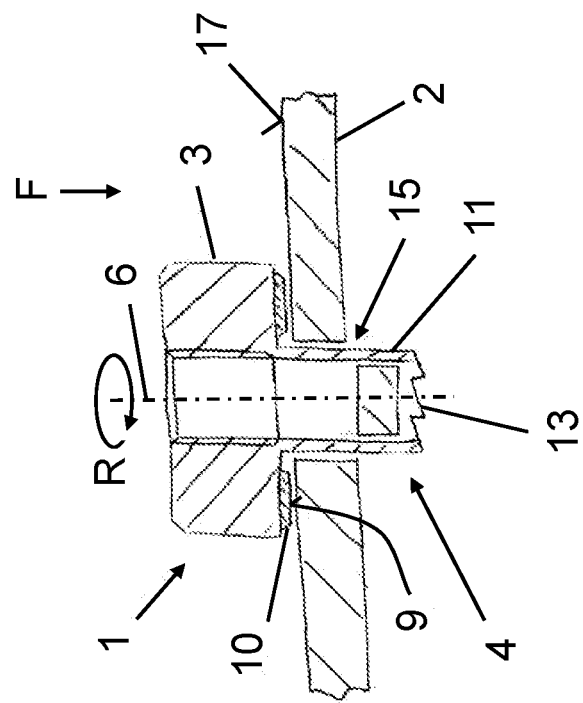
Figure 5:
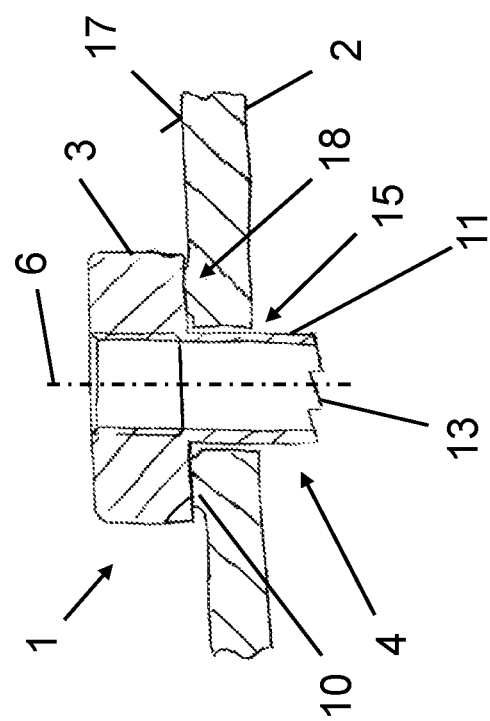

In order that the disclosure may be well understood, there will now be described various forms thereof, given by way of example, reference being made to the accompanying drawings, in which:

FIG. 1 shows a schematic sectional view of a fastening element according to the teachings of the present disclosure, FIG. 2 shows a schematic plan view of a nut head of the fastening element according to FIG. 1, FIG. 3 shows a sectional view of the fastening element according to FIG. 1 in a first process step of a friction welding procedure according to the teachings of the present disclosure, FIG. 4 shows a sectional view of the fastening element according to FIG. 1 in a second process step of the friction welding procedure according to the teachings of the present disclosure, and FIG. 5 shows a sectional view of the fastening element according to FIG. 1 in a third process step of the friction welding procedure according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a schematic sectional view of a fastening element 1 according to the present disclosure. FIG. 2 shows a plan view of the fastening element 1 according to FIG. 1. A fastening element 1 of this kind may also be referred to as a friction welding nut. This fastening element 1, or this friction welding nut, can be welded onto a workpiece 2 by means of a friction welding procedure, as illustrated in FIGS. 3 to 5.

In the friction welding procedure, the fastening element 1 is pressed against the workpiece 2 and rotated. The resulting friction heat causes the fastening element 1 and/or the workpiece 2 to melt, at least in the region of the contact faces, so that, after the end of the rotary movement and the subsequent cooling and solidification of the melts of both components, a welded connection is established.

The welded-on fastening element 1 provides a possibility for fastening further components to the workpiece 2, which are for example screwed to the workpiece 2 by means of a screw connection with the fastening element. For example, this can be desired in the case of thin-walled sheet-metal parts since the small wall thickness of such parts makes it difficult or impossible to introduce threaded bores.

The fastening element 1 has a nut head 3 and a cutting device 4. An outer contour of the nut head 3 has a key face, for example a hexagonal nut, as shown in the plan view according to FIG. 2. The nut head 3 can be of any size or have any key width. Equally, the outer contour of the nut head 3 can be designed as a square nut or any other known nut shape, or equally may have a cylindrical outer contour.

The nut head 3 has a through-bore 5 which extends along a longitudinal central axis 6 (FIG. 1) of the fastening element 1. The through-bore 5 has an internal thread 7 so that a screw can be screwed into the through-bore 5. The internal thread 7 can be provided either partially or completely along the length of the through-bore 5. In some variations, the internal thread 7 is formed in the through-bore 5 in the region of the nut head 3.

The cutting device 4 is provided on an end side 8 of the nut head 3. A friction welding face 9 is formed on this end side 8. This friction welding face 9 serves to establish the friction-welded connection between the fastening element 1 and the workpiece 2. The friction welding face 9 can be formed either directly by the end side 8 of the nut head 3, or it is possible for a welding component 10, which forms the friction welding face 9, to be provided on the end side 8. The welding component 10 can for example be arranged in the form of a welding ring or annular ring on the end side 8. Providing the welding component 10 makes it possible to use different materials for the nut head 3 and the friction welding face 9. The friction welding face 9 can be designed in the form of a circular ring or a segment on the end side 8, and surrounds the cutting device 4.

The cutting device 4 provided on the end side 8 of the nut head 3 is designed as a cylindrical cutting shaft 11. This cutting shaft 11 extends along the longitudinal central axis 6 from the nut head 3, and has a free end portion 12 at the opposite end from the nut head 3. Multiple cutting elements 13 are arranged at the end portion 12 of the cutting shaft 11. In at least one variation the lateral face of the cutting shaft 11 has a smooth surface. The fastening element 1, or at least the cutting shaft 11, can furthermore be provided with a coating, for example a coating for corrosion protection.

As illustrated in FIG. 1, the cutting shaft 11 is designed as a hollow cylinder. Thus, in some variations the through-bore 5 extends through both the nut head 3 and the hollow-cylindrical cutting shaft 11. In at least one variation the hollow-cylindrical cutting shaft 11 has an internal diameter which corresponds to the internal diameter of the through-bore 5 in the nut head 3. In such a variation the external diameter of the hollow-cylindrical cutting shaft 11 is designed to be smaller than the diameter or key width of the nut head 3.

An end edge 14 is formed on the end portion 12 of the hollow-cylindrical cutting shaft 11. The cutting elements 13 are created or formed on the end edge 14. The cutting elements 13 are arranged along the end edge 14 in the form of a ring or a ring segment, and in some variations designed in the shape of saw teeth. Alternatively, the cutting elements 13 can be designed as cutting segments and provided at a distance from one another on the end edge 14.

By virtue of this configuration, the hollow-cylindrical cutting shaft 11 forms a hole saw, core drill or drill crown. This creates a self-cutting fastening element 1 or a self-cutting friction welding nut. This self-cutting fastening element 1 makes it possible to introduce a drilled hole 15 into the workpiece 2 (i.e., to drill the hole 15 into the workpiece 2) and to friction weld the fastening element 1 to the workpiece 2 in one process step.

The process steps of this combined drilling and friction welding procedure, with the fastening element 1, are illustrated in FIGS. 3 to 5. The fastening element 1 is accommodated by a tool 16 and is placed, with the end edge 14 and the cutting elements 13 provided thereon, against a surface 17 of the workpiece 2, as illustrated schematically in FIG. 3. The tool 16 can be a motor-driven rotary device.

The tool 16 imparts, to the fastening element 1, a rotational movement R about the longitudinal central axis 6, and presses the fastening element 1 against the surface 17 with a force F oriented toward the workpiece 2. Owing to the rotational movement R of the fastening element 1, the cutting elements 13 provided on the end edge 14 execute a rotating cutting motion by means of which the drilled hole 15 is introduced into the workpiece 2.

Once the drilled hole 15 has been introduced into the workpiece 2, the force F moves the fastening element 1 further in the direction of the workpiece 2 until the friction welding face 9 of the end side 8 bears against the surface 17 of the workpiece 2 and a contact face is formed. This is shown in FIG. 4.

Owing to the rotational movement R of the fastening element 1 and the resulting friction heat, the friction welding face 9, or the welding component 10, and/or the surface 17 of the workpiece 2 are/is melted in the region of the contact face. After ending of the rotational movement R and the subsequent cooling and solidification of the melt of the friction welding face 9, or of the welding component 10, and/or of the workpiece 2, a strong friction-welded connection 18 is established between the fastening element 1 and the workpiece 2.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An assembly comprising:
a workpiece defining a hole; and
a fastening element comprising
a head portion including an end face disposed above and facing a surface of the workpiece,
a shaft extending from the end face of the head portion and disposed in the hole of the workpiece, and
a cutting device disposed at an end of the shaft away from the head portion,
wherein the end face of the head portion extends radially from the shaft, a friction weld being formed between the end face of the head portion and the surface of the workpiece to join the fastening element to the workpiece, the head portion being completely disposed outside the hole.

2. The assembly according to claim 1, wherein the fastening element is friction-welded to the workpiece along an annular surface of the head portion surrounding the shaft.

3. The assembly according to claim 1, wherein the workpiece is welded to only the end face of the head portion of the fastening element.

4. The assembly according to claim 1, wherein the shaft is disposed in the hole in the workpiece.

5. The assembly according to claim 1, wherein the workpiece has a top surface that is friction-welded to the head portion and a bottom surface opposing the top surface, the shaft being exposed from the bottom surface of the workpiece.

6. The assembly according to claim 5, wherein the shaft extends beyond the bottom surface of the workpiece.

7. The assembly according to claim 1, wherein the cutting device is disposed at a free end of the shaft.

8. The assembly according to claim 1, wherein the fastening element defines a through bore extending along a central axis of the fastening element.

9. The assembly according to claim 8, wherein the fastening element further includes an internal thread on an inner surface of the through bore.

10. The assembly according to claim 1, wherein the head portion, the shaft, and the cutting device are one piece.

11. An assembly comprising:
a workpiece defining a hole; and
a fastening element including
a head portion, a shaft, and a cutting device attached to an end of the shaft away from the head portion, the head portion being disposed completely above outside the hole of the workpiece and including an end face facing a surface of the workpiece, the shaft extending from the end face of the head portion and disposed in the hole of the workpiece,
wherein a friction weld is formed between the end face of the head portion and the surface of the workpiece to join the fastening element to the workpiece.

12. A method for attaching a fastening element to a workpiece, comprising:
rotating the fastening element against a surface of the workpiece, the fastening element comprising a head portion including an end face disposed above and facing a surface of the workpiece, a shaft extending from the end face of the head portion, and a cutting device disposed at an end of the shaft away from the head portion, the end face extending radially from the shaft;
drilling, by the fastening element, a hole in the workpiece while inserting the shaft of the fastening element into the hole of the workpiece until the end face of the head portion of the fastening element is in contact with the surface of the workpiece; and
friction-welding the end face of the head portion to the surface of the workpiece to join the fastening element to the workpiece, the head portion being completely disposed outside the hole.

13. The method according to claim 12, further comprising inserting the shaft into the hole to expose the shaft from another surface of the workpiece opposing the surface that is friction-welded to the head portion.

14. The method according to claim 12, wherein the hole in the workpiece is a through hole.

15. The assembly according to claim 1, wherein the friction weld is disposed completely outside the hole.

* * * * *